METHOD OF IMPLEMENTING MAGNETIC INK CHARACTER RECOGNITION CORRECTIONS

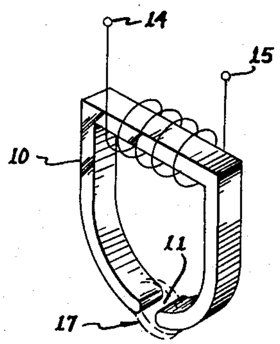
fig 1
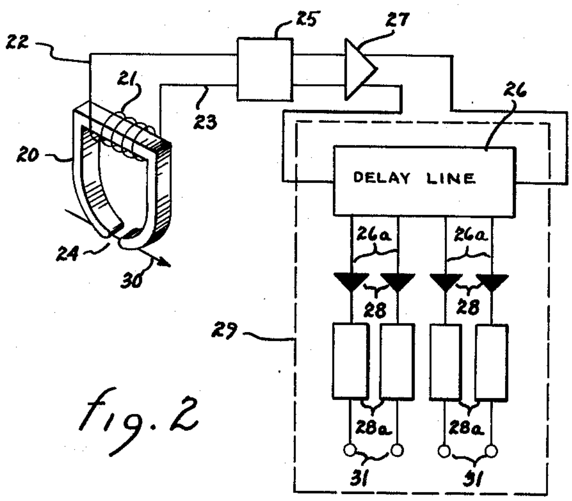
fig. 2
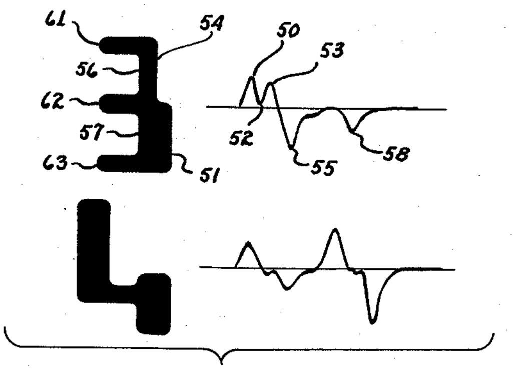
fig. 3
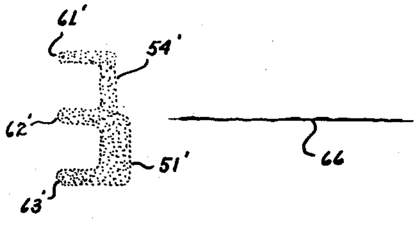
fig. 4
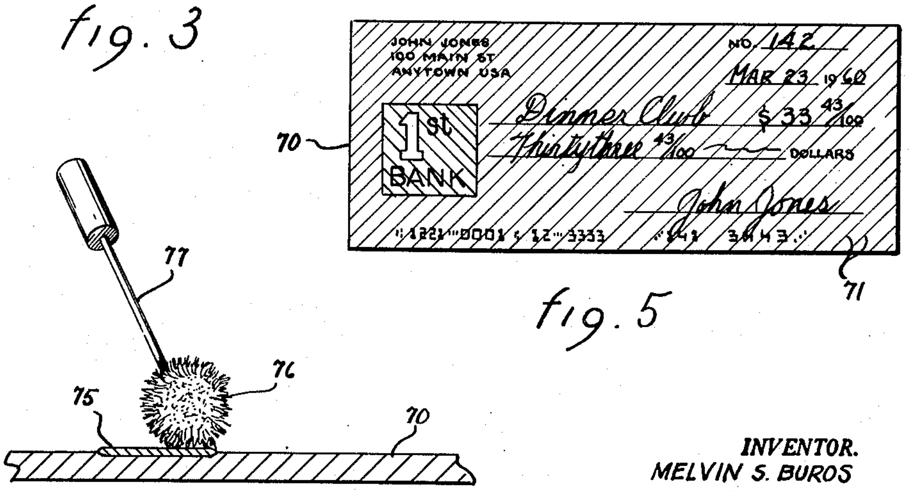
fig. 5
fig. 6
INVENTOR.
MELVIN S. BUROS
BY McLaughlin & Cahill
ATTORNEYS INVENTOR.
MELVIN S. BUROS
BY McLaughlin & Cahill
ATTORNEYS 3,112,151

Melvin S. Buros, 411 N. Central, Phoenix, Ariz.

Filed Apr. 24, 1963, Ser. No. 275,321
6 Claims. (Cl. 346—1)

My invention relates to magnetic ink character recognition and more specifically, to a method of effectively alleviating the difficulties arising from an erroneously encoded document imprinted with magnetic ink character recognition symbols. This application is a continuation-in-part of my co-pending application Serial No. 232,226, filed October 22, 1962.

Present day data processing systems utilize a variety of inputs to data processing machinery. Input equipment such as magnetic tape, paper tape, punched card, magnetic drum and magnetic discs are particularly suited to the input of binary information to the data processing system. However, all of these input equipments are significantly unsuited for those applications in which the information must be humanly readable as well as machine readable. Several schemes have been proposed for the implementation of a stylized font that may be detected by automatic equipment as well as be recognizable to humans. Accordingly, magnetic ink character recognition (MICR) has become adopted as a standard in certain industries such as banks wherein documents are encoded with human readable numbers and are also utilized as input source material for data processing systems. One standardized font, adopted by the American Bankers Association, is known as the E–13B font. Another font, which has been accepted by various commercial enterprises, especially in the European countries, is known as the CMC–7 font. The stylized characters of these fonts are imprinted on the document with an ink containing magnetizable material preferably having a high magnetic retentivity.

The documents, thus encoded, are driven past a magnetizing head to pre-magnetize the characters; subsequently, the characters may be fed past a magnetic read head to sense the existence of magnetized particles and to thereby derive an electrical signal indicative of the respective character.

Many problems have presented themselves with the implementation of MICR fonts. Specifically, one area of peculiar difficulty is that wherein the information has been erroneously encoded on the document. To prevent the erroneous information from entering the data processing system when the document is fed to the appropriate reading equipment, several schemes have been devised. One of these schemes entails the utilization of a substitute document which is encoded with the correct information and is subsequently utilized in the data processing equipment in lieu of the original document. This system obviously requires the original document, containing the authentic signature or other information that cannot be encoded, to be filed and ultimately matched to the substitute document. For example, when the documents referred to are bank drafts or checks, it is necessary to retain the original document or check having the endorsement thereon, and match this check to the substitute document after the data processing procedure is completed. The probability of clerical error, and the complexity of this method are immediately evident when the number of checks or documents being handled by modern data processing equipment is considered.

Another scheme for alleviating the difficulties attending the erroneously encoded document or check, is the utilization of a carrier envelope. In this scheme, the erroneously encoded document is placed within an envelope which, in turn, is encoded properly. The automatic document handling equipment is then required to handle the relatively bulky envelope containing the erroneously encoded document, and the document and the envelope must be separated at the end of the data processing procedure. The bulky envelopes frequently cause equipment failure and are, themselves, subject to failure by being torn, wrinkled, etc.

Still another scheme for overcoming the problem of erroneously encoded checks or documents includes the pasting of an additional strip to the encoded document to extend one side thereof and provide a clear area which may be encoded with the proper characters. The document is then fed to the data processing equipment, and only those characters subsequently encoded on the newly attached strip read. The attachment of an additional strip to the original document results in a document having a variable thickness which frequently causes the document handling equipment to jam. The form of the original document is thus also permanently altered unless the substitute strip is ultimately to be removed in which case the original document is subject to damage during the removal.

Still another scheme entails the attachment of a strip of paper over that portion of the document containing the encoded symbols. The utilization of this approach still yields a document having a variable thickness, thus subjecting the document handling equipment to the possibility of jamming. A further disadvantage stems from the fact that the added strip may cover a portion of the document that may be significant. For example, if the document is a check, the signature on the check may very well pass into and through the encoded characters thereon; thus, the pasting or otherwise securing of the added strip over the encoded characters would also cover a portion of the signature. Further, the placing of an overlay or strip which may be subsequently encoded, may result in difficulties relating to the detection of the magnetized characters imprinted thereon.

In all instances, it is imperative that the ultimately imprinted coded character be magnetizable, and that premagnetization be detectable by the read head of the document handling equipment. The resulting voltage waveform presented by the detection of the pre-magnetized characters is, in effect, the "language" which the data processing system understands and any deviation from a standardized waveform may operate to the detriment of the data processing system. Further, the amplitude of the voltage waveform must be maintained within limits which are discernible by the respective data processing reading equipment. Accordingly, it is an object of the present invention to provide a method of preventing data processing errors due to erroneously encoded magnetic character recognition documents.

It is another object of the present invention to provide a method of and means for correcting erroneously encoded MICR characters.

It is another object of the present invention to provide a method for alleviating the problems arising through the erroneous encoding of a document without giving rise to document handling equipment problems.

It is still another object of the present invention to provide a method for correcting erroneously encoded characters on a document without interfering with other information contained on the document even though the encoding and the other information may be contained on the same physical area of the document.

It is a further object of the present invention to provide a method of correcting encoding errors on MICR encoded documents without impairing the validity, authenticity, or proveability of the document.

It is still a further object of the present invention to provide a means for attenuating the magnetic retentivity of encoded MICR characters to render the characters unreadable to the characters humanly readable.

It is still another object of the present invention to provide a method for attenuating the voltage waveform resulting from the reading of a magnetically encoded document to prevent the recognition of the character by the magnetic character recognition equipment.

Other objects, features and advantages of my invention will become apparent to those skilled in the art as the description thereof proceeds.

Briefly, in accordance with one embodiment of my invention, I implement the alleviation of the difficulties attending the erroneous encoding of a magnetically encoded document by attenuating the magnetic retentivity of the erroneously encoded characters. To achieve this end, I first apply a material that may conveniently be a solvent, for the dissolution of the vehicular binder carrying the magnetizable particles or elements of the encoded characters. The material is preferably applied with a dauber using several strokes. The solvent material is chosen to attack the binder of the magnetizable characters and so that it will not attack the inks normally used for signatures, water marks, etc. The distribution of the magnetic particles and the absorption of same remove the particles from the original area of the imprinted character. The solvent may then be removed to carry away the magnetizable particles loosened by the application of the solvent. Although some magnetizable particles remain, the magnetic field established by the magnetization of the remaining particles is insufficient for the data processing reading equipment to discern and reproduce a recognizable voltage waveform therefrom. This reduction in magnetic retentivity effectively eliminates the readability of the document for machine readable purposes; however, the residue of the solvent and the remaining particles on the document may readily be discernible by the human eye and may be utilized as a reference for subsequent re-encoding of the check or document. The magnetic re-encoding or re-encoding with correct magnetizable characters may take place in the same area or adjacent area of the document without interference with the magnetic field established by subsequent pre-magnetization of the subsequently encoded characters.

My invention may more readily be understood by reference to the following description taken in connection with the drawings in which:

FIG. 1 is a schematic illustration of a magnetic write head that may be used to pre-magnetize magnetizable characters.

FIG. 2 is a schematic illustration of a read head and associated recognition circuitry that may be utilized to recognize pre-magnetized magnetizable characters.

FIG. 3 is an illustration showing standardized MICR characters and the associated voltage waveform derived from reading the respective characters after they have been pre-magnetized.

FIG. 4 is a schematic illustration of an MICR character and its associated voltage waveform as it would appear after application of a solvent in accordance with the teachings of the present invention.

FIG. 5 is an illustration of a document or bank check encoded with MICR characters useful for illustrating the method of the present invention.

FIG. 6 is a cross-section of a portion of a magnetically encoded document showing the magnetizable character in cross-section and illustrating a step of the present invention.

Figure 7:
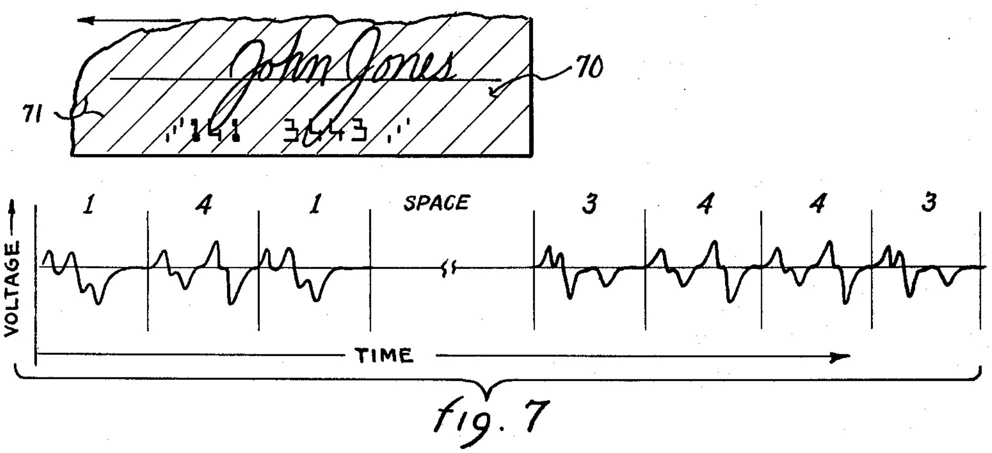
FIGS. 7, 8 and 9 are illustrations of a portion of a document with the corresponding voltage waveforms derived from the reading of the documents to illustrate the method of the present invention.

Referring to FIG. 1, a schematic representation of a magnetizing head is shown. The head comprises a core 10 of ferromagnetic material shaped to provide an air gap 11. The core 10 is provided with a winding 13 connected, at opposite ends thereof, to terminals 14 and 15. The write head or magnetizing head of FIG. 1 may conveniently take the form of the read-write heads conventionally used in magnetic tape devices. The terminals 14 and 15 may be connected to a source of D.C. potential, or may be connected to an alternating potential. In the first instance, a unidirectional flux, indicated in FIG. 1 at 17 is established; when an alternating current is applied to the terminals 14 and 15, the magnetic flux 17 also alternates.

Referring to FIG. 2, a schematic representation is shown of a reading or a detecting scheme for sensing the pre-magnetization of magnetizable characters. A core 20 similar to that shown in FIG. 1 is provided with a winding 21. The winding 21 is connected through conductors 22 and 23 to a preamplifier 25. In view of the general low amplitude of the signal derivable through magnetic sensing, a preamplification stage is usually necessary to preserve the wave shape detected by the core. The output of the preamplifier is subsequently supplied to an amplifier 27 which further amplifies the wave shape and provides the amplified voltage waveform to a recognition network indicated generally by the enclosure 29. Preamplifiers and amplifiers of the type utilized in FIG. 2 are well known in the art; similar preamplifiers and amplifiers have been utilized in the detection and amplification of binary signals recorded on magnetic drums, magnetic tapes and the like. The recognition network 29 may take several forms such as that shown and described in Patent Number 3,000,000 issued to K. R. Eldredge. Basically, recognition networks suitable for use in the scheme of FIG. 2 receive the amplified voltage waveform representing the detected pre-magnetized character and imposes the entire voltage waveform on a delay line 26. When the duration of the delay in the delay line 26 is sufficient to "store" the entire waveform, a sampling and comparison step follows in which the amplitudes of the various peaks of the waveform are utilized to distinguish the various characters. The various portions of the stored waveform existing in the delay line 26 are sampled at the respective points along the delay line indicated by the conductors 26*a*. The voltages existing at these respective points may be "current amplified" for power purposes without amplification of the voltage amplitude. Accordingly, such common circuits as cathode followers 28 may be used to operate upon the voltages existing at the respective points on the delay line 26 prior to the application of these voltages to Schmitt triggers 28*a*. The operation of the Schmitt triggers permit the detection of the amplitude of the voltage applied to the respective trigger circuits resulting in a binary indication at the output of the trigger representing whether or not the sampled voltage was of an amplitude within specified limits. Accordingly, signals are presented to output terminals 31 which selectively represent the binary notation of the sampled voltages in the delay line 26. In this manner, the magnetic character encoded on a document and sensed by the apparatus of FIG. 2 evolves from the detection apparatus as a plurality of signals representing a binary code indicative of the sensed character. If the voltage waveforms have been sufficiently attenuated, no recognition of the waveform occurs, and the output of the recognition network indicates that no recognizable character has been received. The magnetic retentivity of the respective characters prior to the pre-magnetization determines the magnetic field to be presented to the air gap 24 of the core 20; therefore, attenuation of the magnetic retentivity of the respective characters will attenuate the derived voltage waveform presented to the recognition network 29, thus resulting in signals presented at terminals 31 representing the binary notation of the absence of a character.

Referring to FIG. 3, MICR characters 3 and 4 in the E–13B font have been chosen for illustration. Alongside each of these characters is a representative voltage waveform derived from the detection of the magnetic field presented by the corresponding character after it has been pre-magnetized, it being understood that the ability of the character to present a magnetic field or residual induction after pre-magnetization depends on the measure of remanence exhibited by the magnetic material or the magnetic retentivity of the magnetic character. The magnetization of the characters 3 and 4, shown in FIG. 3, takes place by passing the characters from left to right past the air gap 11 of the magnetizing head shown in FIG. 1. The magnetic flux 17 existing in the air gap magnetizes the magnetizable materials of the character. The characters may continue to be passed from left to right until they pass beneath the air gap 24 of the read head 20 shown in FIG. 2. The direction of motion relative to the core 20 is shown by the arrow 30. The rate of change of the flux of the magnetic field of the pre-magnetized characters as they pass through the air gap 24 (e.g. $d\phi/dt$) constitutes a rate of change of flux in the magnetic circuit including the core 20. The rate of change of the flux in the magnetic circuit induces a voltage in the winding 21 to thereby provide a voltage waveform to the preamplifier 25. The voltage waveform is substantially the same as that shown opposite each of the characters 3 and 4.

The characteristics of the respective voltage waveforms are immediately evident. For example, referring to the voltage wave form derived from the character 3, it may be seen that a voltage peak 50 is obtained when the leading edge 51 is detected. The voltage waveform falls to a low at 52 after which time a second peak 53 occurs upon the detection of the second "leading edge" 54. A third peak 55 occurs as the edge represented by the portions 56 and 57 of the character are detected. It may be noted that the peak 55 is negative relative to the peaks 50 and 53. This "inverse peaking" occurs because the rate of change as the character travels from left to right swings from positive to negative for the leading and trailing edges of the character respectively. The remainder of the voltage wave form remains relatively constant with the exception of the negative peak 58 occurring when the trailing edges 61, 62 and 63 pass the read head.

Referring to FIG. 4, an E–13B font magnetizable character is shown. The character shown in FIG. 4 has been treated in accordance with the method of the present invention to attenuate its magnetic retentivity by removal and/or distribution of a substantial portion of the magnetizable particles of the character. Although the character may nevertheless be visible to the human eye, the attenuation of the magnetic retentivity results in a corresponding attenuation of the voltage waveform as indicated to the right of the character in FIG. 4. It may be noted by reference to the voltage waveform of FIG. 4, that the detected rate of change of flux derived from the motion of the pre-magnetized character before it passed the read head results in a voltage waveform 66 that almost imperceptively deviates from a straight line. The attenuated, but still optically visible, character 3 is identified by the same reference numerals used in FIG. 3, with however, primed numerals. The radical attenuation illustrated in FIG. 4 may not be necessary so long as the attenuation is sufficient to prevent the Schmitt triggers from yielding an output signal indicative of the existence of a character. Attenuation of the waveform amplitude to approximately twenty-four percent of the original amplitude is usually sufficient to prevent the triggering of the Schmitt triggers while enabling proper reading of re-encoded characters—placed over the attenuated characters.

In connection with FIGS. 1 through 4, the pre-magnetization may occur with the utilization of alternating current as well as direct current as indicated in the preceding description of FIG. 1. If the characters have been pre-magnetized using alternating current, the resulting field sensed from the pre-magnetized characters will be alternating, and it will be necessary to demodulate the resulting waveform to remove the alternating component.

Referring to FIG. 5, a document such as a check 70 is shown having MICR characters imprinted thereon on the lower right hand corner (E–13B font has been chosen for this illustration). It may be noted that the signature on the check includes a portion which extends into, and intimately contacts, one of the characters. Further, the checks 70 would usually include an imprinted design 71 thereon to prevent erasures and alterations and thus substantially reduce instances of fraud. Assuming that the characters imprinted on the check 70 are erroneous, the effect of the characters on the data processing equipment may be alleviated as generally indicated in FIG. 6. The characters at this point are similar to those shown in FIG. 3. FIG. 6 indicates a cross section of the check 70 revealing the erroneously encoded magnetizable character 75. A dauber 76, saturated with a solvent as indicated previously and attached to a convenient handling means such as a stem 77, may be used to apply the solvent to the character 75.

The solvent employed should be one which attacks the magnetic material sufficiently to permit its removal, but which will not dissolve or appreciably or deleteriously affect indicia on the check other than the magnetic characters. In other words, the usual water mark, the ink signature and printed data on the check should remain unaffected. Generally speaking, aqueous or alcoholic solvents are ineffective, but many organic solvents such as low molecular-weight paraffins, chlorides, hydrocarbons, halogen derivatives of hydrocarbons, and various esters, ethers, amides, aldehydes and ketones provide a base from which many usable solvents may be selected. Single solvents or mixtures of solvents may also be used, depending upon the character of the magnetic material.

With further reference to the magnetic material, it may be pointed out that, in general, they comprise mixtures of a proper vehicle supporting finely divided ferro-magnetic material such as magnetic iron oxides, cobalt and nickel and mixtures thereof, mineral particles preferably having high coercive force and magnetic remanence and even as indicated metal alloys such as iron, nickel alloys, and the like.

The specific vehicle and ferro-magnetic materials employed may depend on various factors, including the application to a document, it being understood that the common practice at the present time is to employ a special typewriter-like instrument known as an encoder and special typewriter ribbon for applying the magnetic character to the document. As shown in FIG. 6, such application has the effect of partially indenting the paper and forcing some of the special magnetic material below the top surface of the document. My invention may be utilized regardless of the specific magnetic material used and the manner of its application to paper.

Commonly the vehicle within which the ferro-magnetic particles are dispersed is a naturally occurring or synthetic wax, resin, high-molecular paraffin and the like, but more commonly mixtures of such materials providing the proper consistency and physical strength. These vehicles also frequently carry a small amount of a plasticizing agent, interface modifying agent, viscosity modifying agent and the like so that the final product, as a whole, will perform in accordance with its intended manner, retain the ferro-magnetic materials in a uniform state of subdivision, adhere to the paper and resist smearing or cracking under ordinary conditions of use. Those skilled in the chemical arts will, therefore, understand that there are many organic solvents for fats, waxes, resins and the like materials employed as part of the ferro-magnetic carrying vehicle which are normally resistant to complete or partial solution by aqueous and alcoholic solvents, but which are readily dissolved and/or softened by so-called "spirit" solvents of which, for example, methylene, chloride, chloroform, carbon tetrachloride, ethylene dichloride, amyl formates, acetates, acetone, petrolum ether, low molecular weight saturated or unsaturated, straight chain or branched chain hydrocarbons, benzene, toluene and other such aliphatic and aromatic substances are illustrative. The important requirement is not so much the complete solubility of the magnetic material as the partial dissolving or softening of the vehicle carrying the magnetic particles and the avoidance of chemical attack against other indicia on the face of the encoded document.

The addition of the solvent to erroneously encoded magnetic characters results in at least a portion of the character or characters being dissolved. Since, in relation to the data processing equipment of which we are concerned here, it is unnecessary, and undesirable, to completely eliminate all traces of the erroneously encoded character, the application of the solvent is not intended to completely remove all traces of the magnetic character. The dissolved portions of the erroneously encoded characters are then absorbed, or distributed, or both by the dauber. Absorbing those portions of the erroneously encoded magnetic characters that have been dissolved by the solvent reduces the amount of magnetic material present in the magnetic characters and thus reduces the magnetic retentivity exhibited by the character; similarly, distribution of the dissolved portion of the erroneously encoded magnetic character will reduce the magnetic retentivity exhibited by the character and will distribute the magnetic particles over an area of the document much greater than the area previously covered by the magnetic material. The combination of absorption and distribution conveniently provided by the dauber 76 greatly facilitates expeditious removal of the magnetic material of the magnetic characters to thereby concomitantly attenuate the magnetic retentivity exhibited by the respective characters.

The solvent, having wetted the document, may now be removed, if desired, in any convenient manner such as, for example, by blotting or gentle rubbing. The solvent should not normally completely remove the visual indications of the character, and what had been previously erroneously encoded on the document or check 70 will remain visible to the human eye. Further, that portion of the signature extending into the erroneously encoded character will remain intact, and the authenticity of the document will not be impaired. The solvents of the character described will not attack the base material or paper and will not affect the water base safety design imprinted on the check. The erroneously encoded character is now similar to that shown in FIG. 4, and the corresponding magnetic retentivity has been sufficiently reduced so that the resulting voltage waveform derived from reading the character is attenuated to the point that it is no longer discernible by the character recognition equipment of the data processing system. The incorrectly encoded character is now in the status of being humanly readable but not machine readable in contrast to its formerly having also been machine readable. The document is subsequently encoded in any convenient manner and may be encoded adjacent to or coincident with, or directly over, those areas previously encoded.

Figure 8:
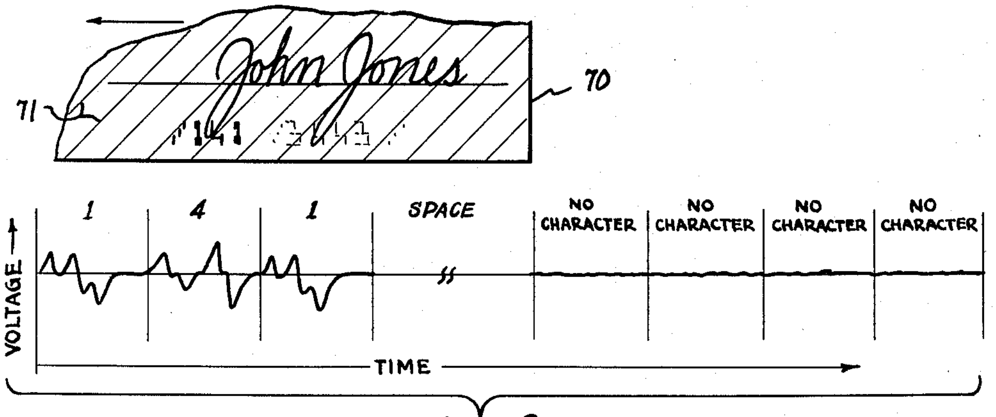
Figure 9:
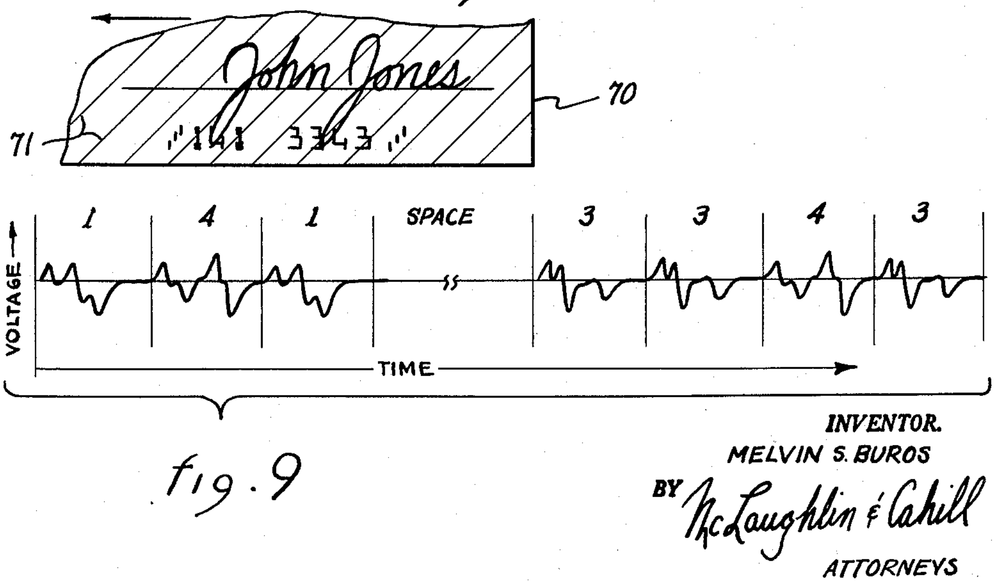

A specific application of the method of my present invention may most easily be seen by reference to FIGS. 7–9. In FIG. 7 I show the lower right hand corner of a bank document or check 70 having magnetic characters encoded thereon. The characters are placed on that portion of the check known as the "clear band" which, in accordance with the standard banking procedures, is maintained free of all printing to permit the encoding of magnetic characters. The portion of the check shown in FIG. 7 includes the encoded numbers 141 3443; it may be noted that both of the "J's" extend into the clear band of the check and interfere with two of the encoded characters. Immediately beneath the corner of the check in FIG. 7, I show the voltage-time curve representing the respective voltage waveforms presented to the recognition network of FIG. 2. It may be noted that the voltage waveforms illustrated are developed when the check passes the read head from right to left. An inspection of the waveform of FIG. 7 reveals that each of the magnetic characters, after having been pre-magnetized, has presented the read head with a flux variation caused by the magnetic retentivity of the respective characters which is unique for each of the different characters. Thus, the voltage derived from the read head and amplified by the preamplifier and amplifier represents, in time-serial fashion: 141 space 3443.

Assuming the check in FIG. 7 had been erroneously encoded, the effect of the erroneously encoded portion on the data processing system may be eliminated by the method of the present invention. An example may be illustrated by a portion of the check 70 of FIG. 7 as shown in FIG. 8. A solvent is applied to the lower right hand corner of the check and specifically to those characters erroneously encoded. In the instance chosen for illustration in FIG. 8, it is assumed that the characters 3443 are in error. The application of the solvent to the characters dissolves at least a portion of each of the characters thus enabling the subsequent absorbing and/or distribution of the dissolved magnetic material to substantially reduce the magnetic retentivity exhibited by each of the characters. It may also be noted, by an inspection of FIG. 8, that the letter "J," previously interfering with the encoded character 4, has not been altered or in any way damaged by the application of the solvent. Further, the water marks characteristic of bank checks, and intended to prevent alterations thereof, have not been affected by the solvent. The solvent, having wetted the check, may be dried by blotting or wiping; however, a separate drying step may not be necessary if the solvent rapidly evaporates. At this point, the check presents characters having magnetic retentivity ultimately yielding the voltage wave-form shown beneath the check in FIG. 8. The voltage waveform will be interpreted by the recognition network as: 141 space, no character, no character, no character and no character. Thus, the binary representation of the detected characters presented at the terminals 31 of FIG. 2 would indicate that only the number 141 exists on the check; however, as indicated in FIG. 8, the number 3443 is still visible, although lightly, even though the magnetic retentivity of the respective characters has been reduced to the point that the recognition network will not discern the characters.

The check of FIG. 8 may then be re-encoded as shown in FIG. 9 with the correct magnetic characters: 141 3343. Even though the correct encoding 3343 is imprinted on the check, an inspection of the check will readily yield the fact that the encoded number is a replacement number for the previously erroneously encoded characters. The voltage-time curve of FIG. 9 illustrates the correct voltage waveform received by the recogntion network and indicates that the number 141 space 3343 has been detected on the check.

The use of the present means and method described herein also yields the advantage of rendering defalcation readily detectable. Protection against defalcation is provided by the detectability of the original erroneously encoded characters through optical inspection. Thus, if an encoded character has been processed in accordance with the method given above, an inspection of the re-encoded document will yield an indication that the document has been changed and will therefore provide a check against defalcation.

It must not be assumed that it is necessary to use the specific features shown and described, such as the use of a specific type of solvent and specific type of solvent applicator or dauber as shown in FIG. 6. Neither is it necessary always to leave the encoded character optically visible, although present typewriter encoding complicates the problem of complete removal of all traces of a magnetic character. The embossed characters shown at the left of check 70 (FIG. 5) are in relief on a substantially flat surface, and they may be attenuated mechanically, as by means of a precisely positioned rotatable abrading wheel which engages only the magnetic characters, sufficiently to eliminate read off, so that corrected magnetic characters may then be applied in the same area. Even when a solvent is used, mere smearing of the ferro-magnetic character across a substantial portion of a document surface may sufficiently attenuate a response, even though authentically such practice may not be recommended.

While I have described by invention with reference to specific embodiments, it will be obvious to those skilled in the art that many modifications thereof may be made without departing from the spirit and the scope of the invention as defined by the appended claims.

I claim:

1. A method of preventing data processing errors due to erroneously encoded magnetic character recognition documents used in data processing equipment, said documents having magnetizable and non-magnetizable indicia thereon, comprising the steps of: applying a solvent that is a solvent to said magnetizable indicia and not a solvent to said non-magnetizable indicia to the erroneously encoded magnetic characters; distributing the portions of said characters dissolved by said solvent over an area larger than that previously occupied by said portions to attenuate the magnetic retentivity of said characters and produce a maximum voltage waveform, when read by said data processing equipment, that is not recognizable as a character by said data processing equipment.

2. A method of preventing data processing errors due to erroneously encoded magnetic character recognition documents used in data processing equipment, said documents having magnetizable and non-magnetizable indicia thereon, comprising the steps of: applying a solvent that is a solvent to said magnetizable indicia and not a solvent to said non-magnetizable indicia to the erroneously encoded magnetic characters; absorbing the portions of said characters dissolved by said solvent while simultaneously distributing the portions of said characters dissolved by said solvent over an area larger than that previously occupied by said portions to attenuate the magnetic retentivity of said characters and produce a maximum voltage waveform, when read by said data processing equipment, that is not recognizable as a character by said data processing equipment.

3. A method of preventing data processing errors due to erroneously encoded magnetic character recognition documents used in data processing equipment, said documents having magnetizable and non-magnetizable indicia thereon, comprising the steps of: applying a solvent that is a solvent to said magnetizable indicia and not a solvent to said non-magnetizable indicia to the erroneously encoded magnetic characters; absorbing the portions of said characters dissolved by said solvent to attenuate the magnetic retentivity of said characters and produce a maximum voltage waveform, when read by said data processing equipment, that is not recognizable as a character by said data processing equipment.

4. A method of preventing data processing errors due to erroneously encoded magnetic character recognition documents used in data processing equipment, said documents having magnetizable and non-magnetizable indicia thereon, comprising the steps of: applying a solvent that is a solvent to said magnetizable indicia and not a solvent to said non-magnetizable indicia to the erroneously encoded magnetic characters; absorbing the portions of said characters dissolved by said solvent while simultaneously distributing the portions of said characters dissolved by said solvent over an area larger than that previously occupied by said portions to attenuate the magnetic retentivity of said characters and produce a maximum voltage waveform, when read by said data processing equipment, that is not recognizable as a character by said data processing equipment; and re-encoding said document with new magnetic characters.

5. A method of preventing data processing errors due to erroneously encoded magnetic character recognition documents used in data processing equipment, said documents having magnetizable and non-magnetizable indicia thereon, comprising the steps of: applying a solvent that is a solvent to said magnetizable indicia and not a solvent to said non-magnetizable indicia to the erroneously encoded magnetic characters to attenuate the erroneously encoded characters and produce a maximum voltage wave amplitude when read by a recognition network of less than 25% of the maximum voltage waveform amplitude previously provided by the encoded character, while leaving said character optically visible; and re-encoding said document with correctly encoded characters in that area of the document surface where the erroneously encoded character was first placed.

6. A method of preventing data processing errors due to erroneously encoded magnetic character recognition documents used in data processing equipment, said documents having magnetizable and non-magnetizable indicia thereon comprising the steps of: applying a solvent that is a solvent to said magnetizable indicia and not a solvent to said non-magnetizable indicia to the erroneously encoded magnetic characters to produce a maximum voltage waveform amplitude when read by a recognition network of less than 25% of the maximum voltage waveform amplitude previously provided by the encoded character, while leaving said character optically visible; re-encoding said document with correctly encoded characters in that area of the document surface where the erroneously encoded character was first placed; and then processing the document in accordance with the normal data processing procedure.

References Cited in the file of this patent

UNITED STATES PATENTS

| | | |
|---|---|---|
| 1,672,790 | Steigleder | Jan. 5, 1928 |
| 2,114,462 | Billings | Apr. 19, 1938 |
| 2,763,204 | Sims | Sept. 18, 1956 |
| 2,881,101 | Ladeuze et al. | Apr. 7, 1959 |
| 2,884,348 | Kulesza | Apr. 28, 1959 |